United States Patent [19]
Stewart, Jr.

[11] 3,769,725
[45] Nov. 6, 1973

[54] IDENTIFICATION PLATE
[76] Inventor: Arthur Stewart, Jr., 780 Inez, Memphis, Tenn.
[22] Filed: Apr. 28, 1972
[21] Appl. No.: 248,627

[52] U.S. Cl. ............................................. 40/10 R
[51] Int. Cl. ............................................ G09f 3/18
[58] Field of Search .............. 63/29 R; 40/10, 20 A, 40/124.5, 129 C, 209

[56] References Cited
UNITED STATES PATENTS
| | | | |
|---|---|---|---|
| 2,017,335 | 10/1935 | Adams | 40/124.5 |
| 2,042,416 | 5/1936 | Weindel | 40/20 A X |
| 2,095,290 | 10/1937 | Roy | 40/124.5 |
| 3,374,568 | 3/1968 | Trammell | 40/209 |

Primary Examiner—Robert W. Michell
Assistant Examiner—Wenceslao J. Contreras
Attorney—John R. Walker, III

[57] ABSTRACT

An identification device for attachment to a door of a vehicle. The device includes an identification plate having certain indicia thereon which will aid in readily identifying an unauthorized operator, i.e., indicating that the vehicle is stolen. Also included is peculiar structure requiring a special tool for attaching the identification plate to the vehicle and structure for obscuring the peculiar attaching structure thus rendering the identification plate substantially tamperproof.

5 Claims, 4 Drawing Figures

PATENTED NOV 6 1973
3,769,725
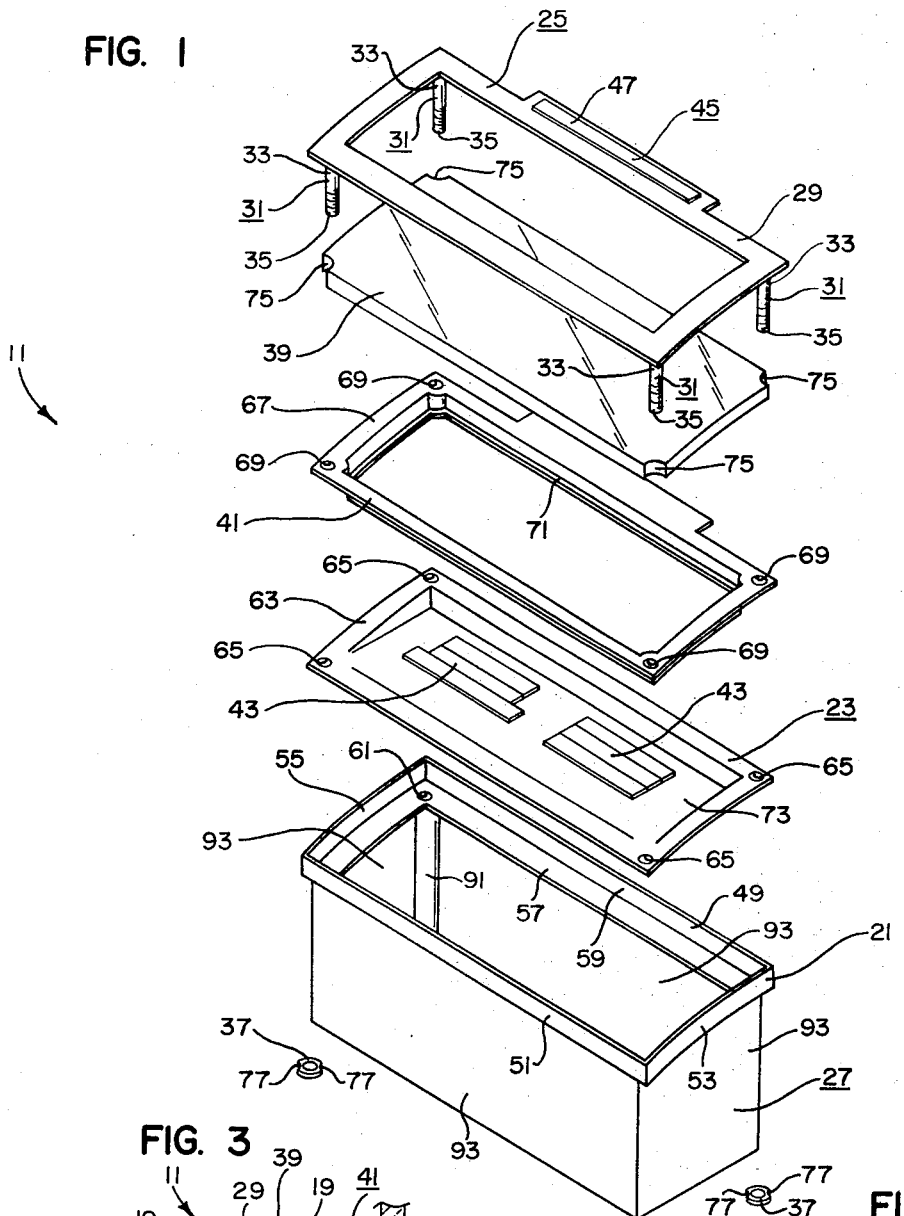
FIG. 1
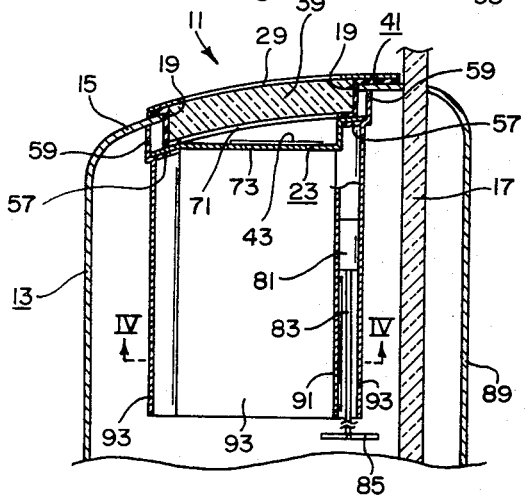
FIG. 3
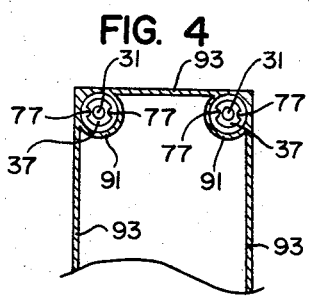
FIG. 2
FIG. 4

IDENTIFICATION PLATE

BACKGROUND OF THE INVENTION

1. Field of the Invention

This invention generally relates to identification plate structure and is particularly directed toward structure for attaching the identification plate to a present-day automobile type vehicle.

2. Description of the Prior Art

Common practice, since the beginning of automotive vehicle registration, has been to attach to the vehicle an identification plate having the manufacturer's serial number, etc., permanently embossed thereon, e. g., like that taught by the Bien U.S. Pat. No. 3,383,784. However, placing the identification plate on the A-post, i. e., in the door jamb, has recently been recognized as an impediment to law enforcement agencies in readily identifying a particular vehicle. In other words, when the vehicle door is closed, the identification plate is obscured, therefore, locking the vehicle door substantially denied visual access thereto. Accordingly, the prevalent practice currently is to place the identification plate on interior structure of the vehicle adjacent the windshield so that it may be visually checked at any time without gaining access to the interior or to the engine compartment of the vehicle.

Locating the identification plate in constant view undoubtedly is helpful in spotting a stolen vehicle; however, certain problems still prevail in identifying a stolen vehicle. Some of these problems are:

First, with the magnitude of vehicles stolen each year, it is virtually impossible for any individual to remember the specifications or identifying features of each stolen automobile. Therefore, operators of stolen vehicles often are stopped by law enforcement officials for traffic violations or other suspicious acts and are released because it is not immediately evident that the vehicle is in fact stolen. Secondly, oftentimes several hours, or perhaps days, elapse before the owner of the vehicle is aware of the fact that his vehicle has been stolen. Therefore, the law enforcement agencies are totally unaware of the fact that this particular vehicle is stolen. Thirdly, even after the law enforcement agencies are notified that a particular vehicle has been stolen, a built in delay of considerable time is required in order to properly annotate these data through the various channels. During the interim, even though the vehicle is stopped for traffice violations, etc., the officer making the arrest is totally unaware of the fact that this vehicle is in fact stolen.

A preliminary patentability search revealed the above-mentioned U.S. Pat. No. 3,383,784 and the following U. S. patents: Knee et al U.S. Pat. No. 1,945,321; Torrison U.S. Pat. No. 2,007,463; Sternberg U.S. Pat. No. 2,973,596; and Waybright U.S. Pat. No. 3,487,567. None of the above references show or suggest applicant's device.

SUMMARY OF THE INVENTION

The present invention is directed towards overcoming the above-mentioned disadvantages and problems relative to readily identifying a stolen vehicle. The concept of the present invention is to provide an identification device which is substantially tamperproof and which is conspicuously displayed, e. g., on the exterior of the door on the operator's side of the vehicle. The indicia contained on the identification plate is self-explanatory, enabling anyone, e. g., even a totally uninformed individual, to readily identify an unauthorized operator, i. e., indicating that the vehicle is stolen.

More specifically, the indicia would include the name of the owner of the vehicle, the make and model of the vehicle, and a list containing the name of each authorized operator. Also included is an authorization directed to the police to impound the vehicle if the operator's name is not among those contained on the identification plate. In this regard, it may be desirable that the indicia on the identification plate comprise a list of numbers representing social security numbers or the individual numbers from the operator's license of those authorized operators, thus eliminating errors in judgment on behalf of the arresting officer, particularly when common names are involved.

It should now be apparent that having the identification device of the present invention affixed to an automobile provides added safeguard against the likelihood of an unscrupulous person stealing the vehicle. Further, in the event the vehicle is stolen, the unauthorized operator would be inclined to avoid speeding or other violations which would likely be quickly detected by the police, resulting in the vehicle being stopped.

Another important feature of the identification device of the present invention is the means for attaching the device to the vehicle, i. e., peculiar structure requiring a special tool for manipulation thereof. Equally important is the structure of the present invention for obscuring the peculiar attaching means, thus rendering the identification plate substantially tamperproof.

Therefore, it is logical to conclude that a vehicle having the identification device of the present invention attached thereto is less likely to be stolen. Additionally, in the event the vehicle is stolen, the likelihood of its being quickly recovered is greatly enhanced. Further, the likelihood of the vehicle being abused or involved in an accident while being operated by an unauthorized operator is reduced since he will be more inclined to operate the vehicle within the law to avoid detection, thus minimizing the risk of having an accident.

BRIEF DESCRIPTION OF THE DRAWING

FIG. 1 is an exploded view of the identification device of the present invention.

FIG. 2 is a perspective view of a special tool used in attaching the identification device of the present invention to an article.

FIG. 3 is a vertical sectional view of the identification device of the present invention depicted in a typical environment of a vehicle door adjacent the glass structure thereof, showing the special hand tool being received in obscuring structure of the instant identification device.

FIG. 4 is a sectional view taken as on the line IV—IV of FIG. 3.

DESCRIPTION OF THE PREFERRED EMBODIMENT

The identification device 11 of the present invention is intended for attachment to a door 13 of a vehicle (partially shown), i. e., preferably on a substantially horizontal portion 15 thereof adjacent the exterior side of a typical door glass 17, as clearly shown in FIG. 3 of the drawings. It should be pointed out that an aperture 19 is provided at a suitable location on the horizontal portion 15 in any well known manner, as by a sabersaw or the like.

The identification device 11 generally includes a main body member 21, a first identification plate 23, means 25 for attaching the plate 23 to the door 13 of the vehicle, and obscuring structure 27 for obscuring the attachment means 25 to render the identification device 11 substantially tamperproof.

The just-mentioned attachment means 25 includes a frame member 29, a plurality of studs 31 having proximal and distal ends 33, 35 thereto, and a plurality of peculiar shaped nuts 37, respectively being threadedly received by the studs 31 in a manner yet to be disclosed.

The proximal ends 33 of the studs 31 are fixedly attached, as by welding or the like, to the frame member 29 adjacent the corners thereof substantially as depicted in FIG. 1 of the drawings. It should be understood that the aperture 19 provided in the door 13 has predetermined dimensions thereto, i. e., with respect to the perimeter dimension of the frame member 29 and certain structure yet to be described of the main body member 21.

The identification device 11 also includes a transparent cover 39 formed from any transparent material such as glass or the like and which is sandwiched between the first identification plate 23 and the frame member 29. Additionally, a gasket 41 is included which seals the first identification plate 23 from without. The gasket 41 is disposed between the identification plate 23 and the transparent cover 39.

The identification plate 23 includes certain indicia 43 for identifying all drivers authorized to operate the vehicle having the identification device 11 attached thereto. In other words, the indicia 43 may include the names of the authorized operators, their respective Social Security numbers, and/or their respective operator's license numbers, etc. Further, the indicia 43 may include information for identifying the vehicle having the identification device 11 attached thereto, e. g., the make and serial number thereof, etc.

The identification device 11 also includes a second identification plate 45 which is preferably fixedly attached to the frame member 29 as clearly shown in FIG. 1 of the drawings. The second identification plate 45 includes indicia 47 which may optionally pertain to information which identifies the vehicle to which the identification device 11 is attached, e. g., the make of the vehicle and the serial number thereof. Further, the indicia 47 includes information directed toward the law enforcement agencies requesting them to impound the vehicle if the operator thereof cannot produce suitable identification to prove that he is one of the operators listed on the identification plate 23, e. g., POLICE — IF NOT AN AUTHORIZED DRIVER, PLEASE IMPOUND THIS VEHICLE.

The main body member 21 includes the obscuring structure 27 and a framelike upper portion including a pair of opposing angleiron members 49, 51 joined at the opposite end thereof by a second pair of opposing angleiron members 53, 55. The members 49, 51, 53, 55, being fixedly attached one to the other as by welding or the like, establish a substantially horizontal ledge 57 which is surrounded by a continuous wall 59. The upper edge of the wall 59 has a perimeter dimension greater than that of the aperture 19 for suitably engaging the underneath surface of the horizontal portion 15 of the door 13.

The horizontal ledge 57 is provided with a plurality of apertures 61 for respectively receiving the studs 31. The identification plate 23 includes a planar flange portion 63 extending about the perimeter thereof as clearly depicted in FIG. 1. The underneath surface of the flange portion 63 is intended to contiguously engage the horizontal ledge 57. Accordingly, the flange portion 63 is provided with a plurality of apertures 65 which are in alignment with the apertures 61 so that the respective studs 31 may freely pass therethrough.

The gasket 41 includes a planar flange portion 67 having a plurality of apertures 69 arranged thereon and in alignment with the apertures 61 so as to allow free passage therethrough of the respective studs 31. Additionally, the gasket 41 includes a second continuous planar flange portion 71 extending a predetermined distance downwardly from the flange portion 67 thereof.

The identification plate 23 also includes a planar surface 73, having the indicia 43 suitably embossed thereon, which is displaced a predetermined distance downwardly from the flange portion 63 thereof.

The transparent cover 39 preferably is provided with arcuate portions 75 adjacent the corners thereof so as to allow free passage thereabout of the studs 31.

The following is a preferred sequence for installing the identification device 11 to the door 13: The main body member 21 is placed beneath the horizontal portion 15 so that the upper edge of the continuous wall 59 thereof engages the underneath surface of the horizontal portion 15 adjacent the perimeter of the aperture 19. The lower surface of the flange portion 63 is placed in contiguous engagement with the horizontal ledge 57, with the planar surface 73 extending downwardly from the horizontal ledge 57 as clearly shown in FIG. 3 of the drawings. The gasket 41 is placed over the identification plate 23, i. e., the underneath surface of the flange portion 71 contiguously engages the upper surface of the flange portion 63 so that the apertures 69 thereof are in alignment with the apertures 61 and 65. Additionally, the underneath surface of the flange portion 67 contiguously engages the upper surface of the horizontal portion 15 adjacent the aperture 19.

The transparent cover 39 is placed over the gasket 41, i. e., the portion adjacent the perimeter thereof contiguously engages the upper surface of the flange portion 71 with the upper surface thereof being substantially flush with the upper surface of the flange portion 67. The attachment means 25 is placed over the transparent cover 39, i. e., the studs 31 being adjacent the arcuate portions 75 and freely extending through the apertures 61, 65 and 69 to allow the lower surface of the frame member 29 to contiguously engage the upper surface of the flange portion 67. The peculiar shaped nuts 37 are threadedly received by the studs 31, thus clamping the perimeter portion of the horizontal portion 15 of the door 13 adjacent the aperture 19 between the frame member 29 and the main body member 21.

The device 11 includes structure which renders the identification plate substantially tamperproof. The first technique implemented in rendering the device 11 tamperproof is the peculiar shape of the nuts 37, e. g., the nut 37 being non-standard might simply be circular in shape with notched portions 77 provided therein. Therefore, common hand tools, other than pliers or the like, will not suitably engage the nuts 37 for removal thereof. Accordingly, a special hand tool 79 is included which is provided with a socketlike portion 81 as clearly shown in FIG. 2 of the drawings. Additionally, the hand tool 79 includes an elongated shaft portion 83 having the upper end thereof fixedly attached to the socketlike portion 81 and the lower end thereof fixedly attached to a handle 85. From FIG. 2 of the drawings, it may also be seen that the socketlike portion 81 includes a pair of ridges 87 which suitably engage the nuts 37, i. e., the ridges 87 being complementally shaped and sized with the notched portions 77 thereof.

The obscuring structure 27 precludes the use of pliers for removing the nuts 37 and obscures the nuts 37 from view, thus obviating the likelihood of an unscrupulous person from viewing the nuts 37 and subsequently improvising a substitute for the special hand tool 79. It should be pointed out that in order to gain access to the nuts 37, it is first necessary to remove certain interior trim panels depicted by the numeral 89 (FIG. 3) of the door 13. This task also contributes to the difficulty experienced in attempting to tamper with the identification device 11.

The obscuring structure 27 includes a plurality of tubular members 91 respectively having one of the ends thereof concentrically disposed about the apertures 61 and fixedly attached to the horizontal ledge 57, as by welding or the like. In other words, the respective studs 31 are received in the tubular members 91 which extend a predetermined distance beyond the distal ends 35 thereof. Therefore, even though an unscrupulous person is provided with the knowledge of the shape of the nuts 37, he cannot use pliers or the like for the removal thereof.

In order to preclude the unscrupulous person from breaking the tubular members 91 from the horizontal ledge 57, a plurality of reinforcement plates 93 are fixedly attached thereto, as by welding or the like. Additionally, the upper edges of the reinforcement plates 93 preferably are fixedly attached to the underneath surface of the horizontal ledge 57, as by welding or the like.

Accordingly, the lower ends of the tubular members 91, being adjacent the lower edges of the reinforcement plates 93, are open so that the special tool 79 may freely pass therethrough, as shown in FIG. 3. More specifically, the nuts 37 are turnably driven onto the stud 31 by the hand tool 79 extending through the tubular members 91 so that the nuts 37 bear against the underneath surface of the horizontal ledge 57 adjacent the apertures 61 therein.

From the foregoing, it should now be apparent that access to the identification plate 23 is substantially denied except by the use of the special tool 79. Accordingly, in the event it is desirable to change the indicia 43 on the identification plate 23, the identification device 11 may be removed by use of the special tool 79 and reinstalled subsequent to effecting the desirable change.

Although the invention has been described and illustrated with respect to a preferred embodiment thereof, it is to be understood that it is not to be so limited since changes and modifications may be made therein which are within the full intended scope of the invention.

I claim:

1. An identification device for attachment to the door structure of a vehicle adjacent a prepared aperture therein, said device comprising a main body member having certain upper dimensions thereof greater than the dimensions of the prepared aperture for engaging the underneath surface of the door structure of the vehicle adjacent the perimeter of the prepared aperture, first identification plate means for displaying certain indicia arranged on the upper surface thereof, said first identification plate means being disposed with at least a portion of the lower surface thereof engaging a portion of said main body member, frame means having a greater perimeter dimension than said prepared aperture for engaging the outer surface of the door structure of the vehicle adjacent the perimeter of the prepared aperture, a plurality of stud means having proximal and distal ends thereto, said proximal ends thereof being fixedly attached to said frame means, said main body member being provided with a plurality of apertures for respectively receiving said plurality of stud means, a plurality of peculiar nut means respectively being threadedly received by said stud means for holding said first identification plate means to the vehicle, a portion of said door structure thereof being sandwiched between said main body member and said frame means with said indicia on said first identification plate means being visibly displayed and outlined by said frame means, and a plurality of tubular members respectively having one of the ends thereof concentrically disposed about said plurality of apertures provided in said main body member and being fixedly attached thereto, said tubular members respectively receiving said plurality of stud means and said peculiar nut means with said tubular members extending a predetermined distance beyond said distal ends of said stud means to obscure said peculiar nut means.

2. The device of claim 1 in which is included transparent cover means for protecting said first identification plate means, said cover means being disposed between said first identification plate means and said frame means with said indicia on said first identification plate means being visibly displayed therethrough.

3. The device of claim 2 in which is included gasket means for sealing said first identification plate means from without, said gasket means being disposed between the outer surface of the door structure of the vehicle and said frame means with a portion thereof being received between said first identification plate means and said cover means.

4. The device of claim 3 in which is included second identification plate means for displaying certain indicia arranged on the upper surface thereof, said second identification plate means being attached to the outer surface of said frame means.

5. The device of claim 4 in which is included special hand tool means for mating with said peculiar nut means and for facilitating manually driving said nut means securely onto said stud means.

* * * * *